(12) United States Patent
Motonaga

(10) Patent No.: US 10,848,694 B2
(45) Date of Patent: Nov. 24, 2020

(54) IMAGING APPARATUS AND METHOD FOR CONTROLLING IMAGE APPARATUS HAVING PIXEL SATURATION

(71) Applicant: CANON KABUSHIKI KAISHA, Tokyo (JP)

(72) Inventor: Yusaku Motonaga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/400,837

(22) Filed: May 1, 2019

(65) Prior Publication Data
US 2019/0349539 A1    Nov. 14, 2019

(30) Foreign Application Priority Data
May 9, 2018    (JP) ................. 2018-090504

(51) Int. Cl.
*H04N 5/359* (2011.01)
*H04N 5/378* (2011.01)
*H04N 5/369* (2011.01)

(52) U.S. Cl.
CPC ....... *H04N 5/3591* (2013.01); *H04N 5/36961* (2018.08); *H04N 5/378* (2013.01)

(58) Field of Classification Search
CPC ... H04N 5/3591; H04N 5/378; H04N 5/36961
See application file for complete search history.

(56) References Cited

U.S. PATENT DOCUMENTS

| | | | |
|---|---|---|---|
| 2010/0245631 A1* | 9/2010 | Hoda | H04N 5/3696 348/241 |
| 2013/0002902 A1* | 1/2013 | Ito | H04N 5/3572 348/224.1 |
| 2013/0002936 A1* | 1/2013 | Hirama | H04N 5/23212 348/349 |
| 2013/0235276 A1* | 9/2013 | Ogawa | H04N 5/23212 348/703 |
| 2013/0293736 A1* | 11/2013 | Kuwazoe | H04N 5/3765 348/222.1 |
| 2016/0344916 A1* | 11/2016 | Murao | H04N 5/2353 |
| 2017/0310880 A1* | 10/2017 | Kikuchi | H04N 5/23212 |
| 2019/0199952 A1* | 6/2019 | Wan | H04N 5/232 |

FOREIGN PATENT DOCUMENTS

JP    2016-92692 A    5/2016

* cited by examiner

*Primary Examiner* — Jason A Flohre
(74) *Attorney, Agent, or Firm* — Canon U.S.A., Inc. IP Division

(57) ABSTRACT

An influence of blooming in which electric charges leak from a first pixel group to a second pixel group is reduced. An imaging apparatus includes a first pixel group, a second pixel group, a detection unit, and a correction unit. The first pixel group includes first pixels for generating signals through photoelectric conversion. The second pixel group includes second pixels for generating signals through photoelectric conversion. The detection unit is configured to detect saturation of first pixels in the first pixel group. The correction unit is configured to, in a case where saturation of the first pixels is detected, correct signals of second pixels in the second pixel group corresponding to the first pixels where the saturation has been detected.

37 Claims, 17 Drawing Sheets

A-A SECTIONAL VIEW

PLAN VIEW

PLAN VIEW

A-A SECTIONAL VIEW

US 10,848,694 B2

IMAGING APPARATUS AND METHOD FOR CONTROLLING IMAGE APPARATUS HAVING PIXEL SATURATION

BACKGROUND

Field

One disclosed aspect of the embodiments relates to an imaging apparatus and a method for controlling the imaging apparatus.

Description of the Related Art

Digital still cameras, digital video cameras, and other imaging apparatuses use a complementary metal oxide semiconductor (CMOS) image sensor. In some CMOS image sensors, a plurality of pixels arranged in a matrix form includes pixels used for other than image capturing, such as focus detection pixels based on a phase difference detection method. These pixels are what is called functional pixels. In focus detection with the phase difference detection method, an image sensor receives light fluxes having passed through a plurality of exit pupils of an imaging lens, and detects the shift amount of output signals based on the quantity of received light, i.e., the relative position shift amount in the direction of light flux division. Since the focus direction and shift amount of the imaging lens can be directly calculated, the image sensor including focus detection pixels employing the phase difference detection method enables high-speed focus detection even during live viewing and moving image capturing.

Imaging pixels are arranged around these functional pixels. In a case of imaging a certain subject, correct signals may not be output from the functional pixels because of the influence of imaging pixels. One of such phenomena is blooming in which a pixel is saturated and electric charges leak to surrounding pixels. Blooming causes signals of pixels around saturated pixels to take inappropriate values, resulting in false signals. In particular, imaging pixels have higher sensitivity and are more likely to be saturated than focus detection pixels. Therefore, blooming from imaging pixels to functional pixels frequently occurs, and accordingly, focus detection pixels may output false signals to bring about inappropriate focus detection.

Japanese Patent Application Laid-Open No. 2016-92692 discusses a technique for resetting electric charges as a cause of blooming. This method performs an electronic shutter operation for focus detection pixels a plurality of times to reduce blooming scenes. However, this method premises that the charge accumulation time does not overlap between imaging pixels and focus detection pixels, and blooming countermeasures cannot be taken in conditions other than the above condition.

Also, in an image sensor for reading pixels on an imaging plane with different exposure for each region, blooming may occur from the pixel group having received first exposure to the pixel group having received second exposure depending on the read timing.

SUMMARY

An imaging apparatus includes a first pixel group, a second pixel group, a detection unit, and a correction unit. The first pixel group includes first pixels for generating signals through photoelectric conversion. The second pixel group includes second pixels for generating signals through photoelectric conversion The detection unit is configured to detect the saturation of first pixels in the first pixel group. The correction unit is configured to, in a case where the saturation of the first pixels is detected, correct signals of second pixels in the second pixel group corresponding to the first pixels where the saturation has been detected.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the accompanying drawings. The following exemplary embodiments are to be considered as illustrative examples for achieving the disclosure, and may be corrected and modified as required depending on the configuration of an apparatus according to the disclosure and other various conditions. The disclosure is not limited to the following exemplary embodiments.

Figure 1:
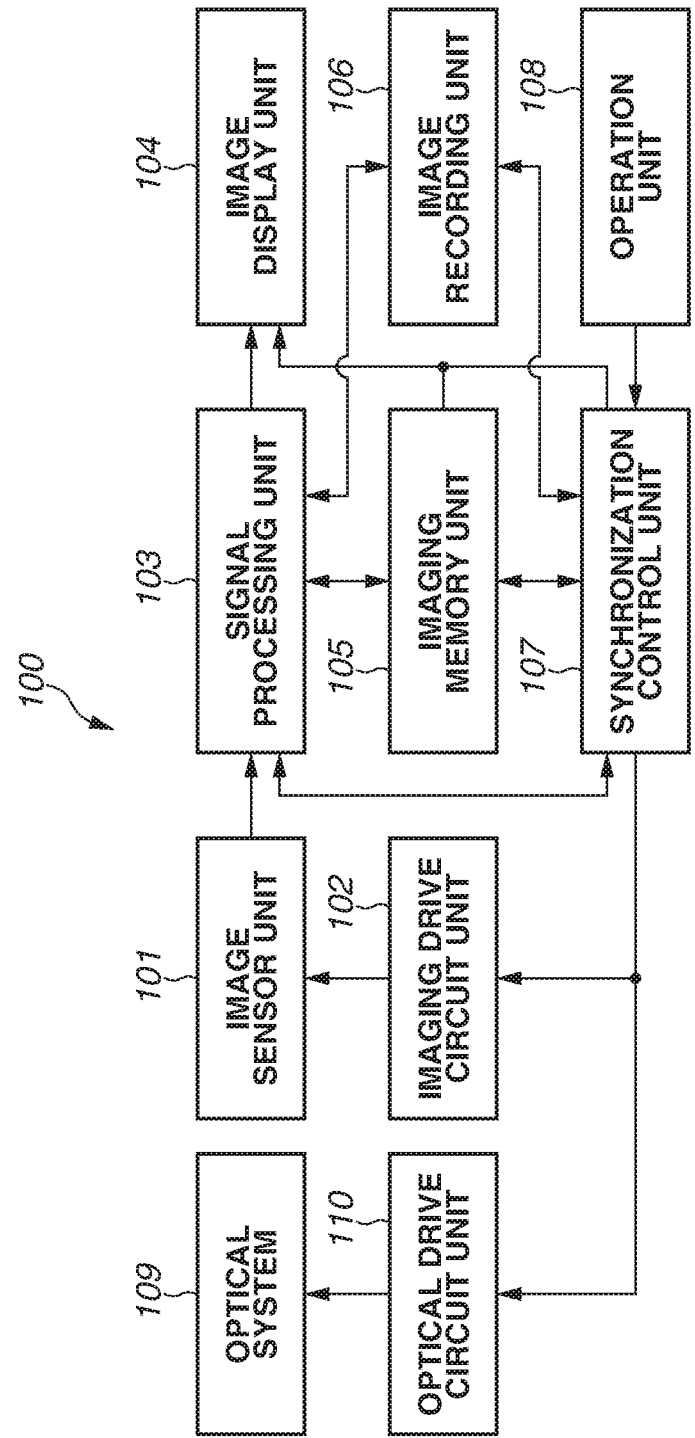
FIG. 1 illustrates an example of a configuration of an imaging apparatus according to a first exemplary embodiment.

FIG. 1 illustrates an example of a configuration of an imaging apparatus 100 according to a first exemplary embodiment. The imaging apparatus 100 includes an image sensor unit 101 configured to selectively output imaging signals and phase difference signals. The imaging apparatus 100 includes the image sensor unit 101, an imaging drive circuit unit 102, a signal processing unit 103, an image display unit 104, an imaging memory unit 105 for storing images, an image recording unit 106, a synchronization control unit 107, an operation unit 108, an optical system 109, and an optical drive circuit unit 110. Several of the components may be implemented by special circuits or by a programmable processor or a combination of both. The programmable processor may be a central processing unit (CPU), a device or an apparatus that is configured to execute instructions stored in a storage medium to perform operations described in the following. For example, the signal processing unit 103 may be realized by a programmable processor that executes instructions stored in a memory to perform various control and signal processing operations described in the flowcharts in FIGS. 8, 12, and 15 and other operations described in FIGS. 9A, 9B, 9C, and 9D.

Components of the imaging apparatus 100 will be described below. The image sensor unit 101 includes a plurality of pixels arranged in a two-dimensional matrix form, and a circuit for outputting signals read from the pixels, in a predetermined order. The imaging drive circuit unit 102 drives the image sensor unit 101 to read pixel signals of the image sensor unit 101 at a predetermined timing.

The signal processing unit 103 controlled by control signals from the synchronization control unit 107 converts output signals of the image sensor unit 101 into image data, outputs and inputs the image data to/from the imaging memory unit 105 and the image recording unit 106, and outputs the image data to the image display unit 104. The image display unit 104, a display device controlled by control signals from the synchronization control unit 107, displays image data stored in the signal processing unit 103 and the image recording unit 106.

The imaging memory unit 105, a temporary storage device controlled by control signals from the synchronization control unit 107, stores image data from the signal processing unit 103. The image recording unit 106 controlled by control signals from the synchronization control unit 107 records and reads image data to/from the signal processing unit 103.

The synchronization control unit 107 is a control circuit for controlling the entire imaging apparatus 100 according to instructions from the operation unit 108. The operation unit 108 includes input devices such as switches, push buttons, and a touch panel attached to the image display unit 104.

Components of a lens barrel will be described below. The optical system 109 is an optical device including a focusing lens for forming a subject image on the image sensor unit 101, a zoom lens for performing optical zooming, a diaphragm for adjusting the brightness of the subject image, and a shutter for controlling exposure. The optical drive circuit unit 110 controlled by control signals from the synchronization control unit 107 drives the optical system 109.

Figure 2:
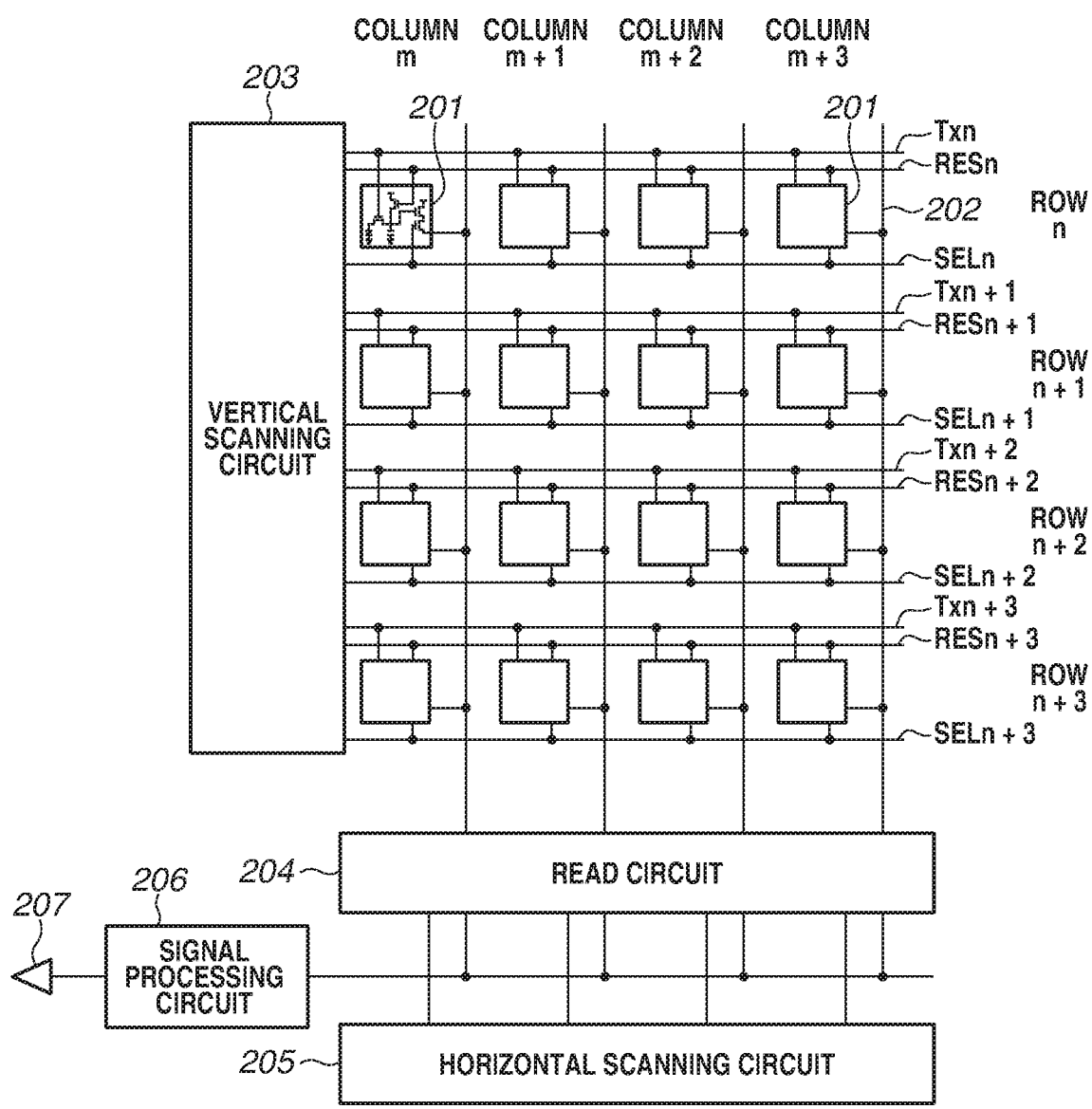
FIG. 2 illustrates an example of a configuration of an image sensor according to the first exemplary embodiment.

FIG. 2 illustrates an example of a configuration of the image sensor unit 101 illustrated in FIG. 1. For example, the image sensor unit 101 includes pixels 201 arranged in a 4-by-4 matrix form, i.e., in columns m to m+3 and rows n to n+3. Although, in FIG. 2, four columns (columns m to m+3) and four rows (rows n to n+3) are illustrated to simplify the description, a number of pixels 201 are actually arranged in two-dimensional way.

A pixel 201 generates an analog signal subjected to photoelectric conversion in synchronization with a signal from a vertical scanning circuit 203. A plurality of the pixels 201 is divided into a plurality of pixel groups, a pixel group-a, a pixel group-b, and so on. Each pixel group operates at different timing. For example, the pixel group-a includes a plurality of imaging pixels, and the pixel group-b includes a plurality of functional pixels.

A signal output line 202 provided for each column of the pixels 201 outputs output signals of the pixels 201 to a read circuit 204. The read circuit 204 performs reading the signals from the columns, converting the read signals into digital data, and detecting saturation. The vertical scanning circuit 203 controls the pixels 201 in row n via control lines Txn, RESn, and SELn in row n. The vertical scanning circuit 203 also controls the pixels 201 in row n+1 via control lines Txn+1, RESn+1, and SELn+1 in row n+1. The vertical scanning circuit 203 also controls the pixels 201 in row n+2 via control lines Txn+2, RESn+2, and SELn+2 in row n+2. The vertical scanning circuit 203 also controls the pixels 201 in row n+3 via control lines Txn+3, RESn+3, and SELn+3 in row n+3.

The read circuit 204 includes an analog-to-digital conversion circuit for converting the analog signal of the signal output line 202 in each column into a digital signal. A horizontal scanning circuit 205 controls digital signal transmission from the read circuit 204 to a sensor processing circuit 206. The sensor processing circuit 206 performs data format conversion to output the digital signal from output port 207 and performs a part of signal processing of the signal processing unit 103 on the digital signal input from the read circuit 204. An output port 207 outputs the output signal of the sensor processing circuit 206.

Figure 3:
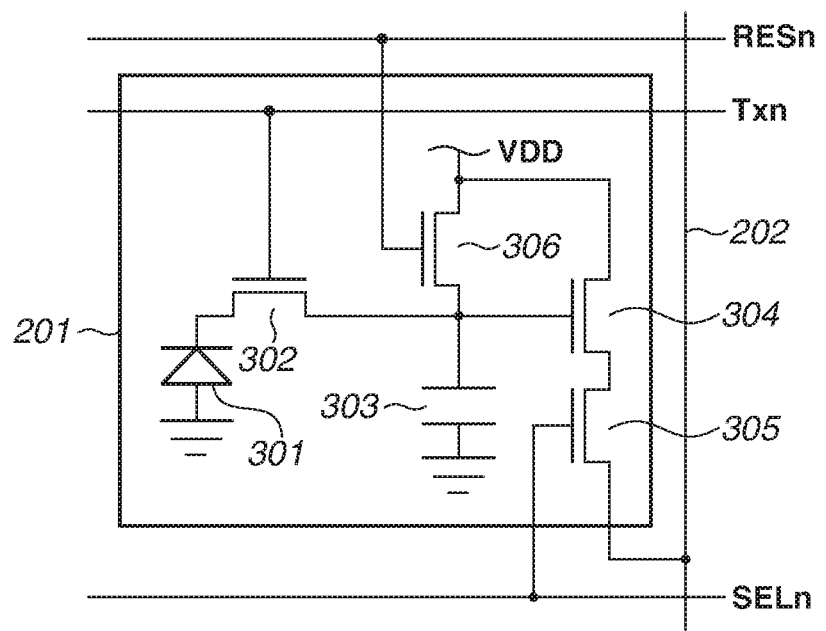
FIG. 3 illustrates an example of a configuration of a pixel according to the first exemplary embodiment.

FIG. 3 illustrates an example of a configuration of each pixel 201 in row n illustrated in FIG. 2. The pixels 201 in rows n+1 to n+3 have a similar configuration to the configuration of the pixels 201 in row n. Each pixel 201 includes a photodiode 301, a transfer transistor 302, a floating diffusion (FD) capacitor 303, a source follower (SF) transistor 304, a selection transistor 305, and a reset transistor 306.

The photodiode 301 is a photoelectric conversion unit for converting light into electric charges and accumulating electric charges. The transfer transistor 302 transfers electric charges accumulated in the photodiode 301 to the FD capacitor 303. The control line Txn controls the gate of the transfer transistor 302. The FD capacitor 303 accumulates electric charges. The reset transistor 306 resets electric charges in the FD capacitor 303. The control line RESn controls the gate of the reset transistor 306. The SF transistor 304 outputs a voltage based on electric charges accumulated in the FD capacitor 303. The selection transistor 305 outputs the output node of the SF transistor 304 to the signal output line 202. The control line SELn controls the gate of the selection transistor 305.

Figure 4B:
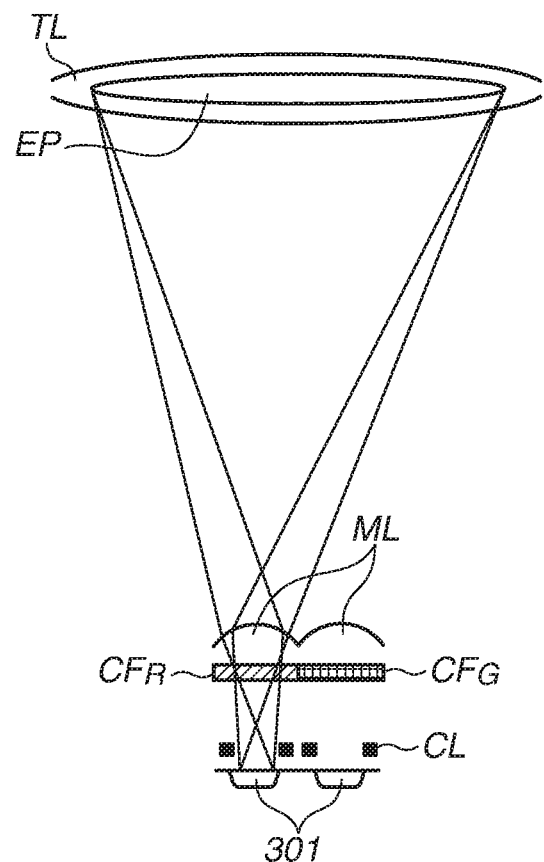
FIGS. 4A and 4B illustrate imaging pixels according to the first exemplary embodiment.
Figure 4A:
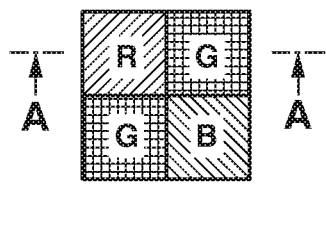
Figure 5A:
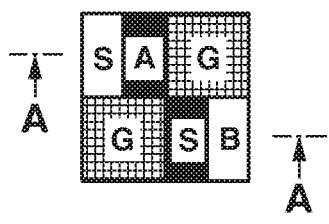
FIGS. 5A and 5B illustrate functional pixels according to the first exemplary embodiment.
Figure 5B:
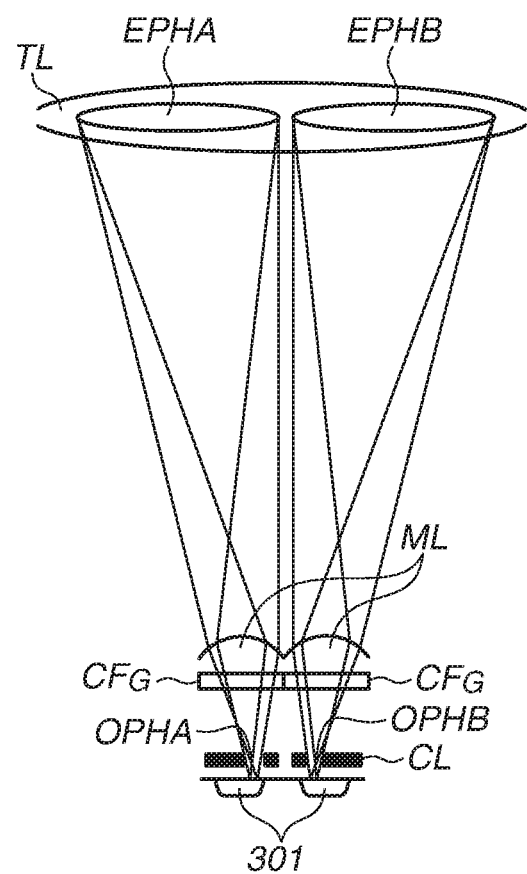

FIGS. 4A and 4B illustrate a structure of imaging pixels of the plurality of the pixels 201. FIGS. 5A and 5B illustrate a structure of functional pixels out of the plurality of the pixels 201. FIGS. 4A and 4B illustrate an arrangement and structure of imaging pixels, respectively. FIG. 4A is a plan view illustrating imaging pixels in 2 rows by 2 columns. FIG. 4A illustrates imaging pixels in Bayer arrangement including two green (G) pixels, one red (R) pixel, and one blue (B) pixel. This 2-by-2 Bayer arrangements are repetitively arrayed. The R, G, and B pixels are imaging pixels.

FIG. 4B is a sectional view taken along the A-A line illustrated in FIG. 4A. A micro lens ML is disposed in the foremost plane of each pixel. A color filter CFR is a red (R) color filter, and a color filter CFG is a green (G) color filter. Each of photodiodes 301 corresponds to the photodiode 301 illustrated in FIG. 3. A wiring layer CL forms signal lines for transmitting various signals in the image sensor unit 101. A lens TL having an exit pupil EP corresponds to the optical system 109 illustrated in FIG. 1.

FIGS. 5A and 5B illustrate an arrangement and structure of functional pixels, respectively. The following describes focus detection pixels as examples of functional pixels. FIG. 5A is a plan view illustrating pixels in 2 rows and 2 columns including focus detection pixels. The pixels in 2 rows and 2 columns illustrated in FIG. 5A include two G pixels and two focus detection pixels SA and SB. A G pixel is an imaging pixel having the same structure as the G pixel illustrated in FIG. 4A. The focus detection pixels SA and SB having different structures from the imaging pixels (R, G, B pixels) are used for focus detection. The R, G, and B pixels having the same structure are used for image generation.

FIG. 5B is a sectional view taken along the A-A line illustrated in FIG. 5A. The micro lens ML and the photodiode 301 illustrated in FIG. 5B have the same structures as the micro lens ML and the photodiode 301 illustrated in FIG. 4B. A color filter CFG is disposed in the focus detection pixels SA and SB. In the focus detection pixel SA, since the opening OPHA of the wiring layer CL is biased to the right, the photodiode 301 receives the light flux that has passed an exit pupil EPHA to the left of the lens TL. In the focus detection pixel SB, since the opening OPHB of the wiring layer CL is biased to the left, the photodiode 301 receives the light flux that has passed an exit pupil EPHB to the right of the lens TL.

The focus detection pixels SA are regularly arranged in the horizontal direction, and a subject image acquired by the group of the focus detection pixels SA is referred to as an A image. The focus detection pixels SB are regularly arranged in the horizontal direction, and a subject image acquired by the group of the focus detection pixels SB is referred to as a B image. The signal processing unit 103 detects relative positions of the A and B images to detect the focal point shift amount (defocus amount) of a subject image. Based on the defocus amount detected, the synchronization control unit 107 instructs the optical drive circuit unit 110 to perform autofocus (AF) control. The optical drive circuit unit 110 drives the focusing lens of the optical system 109 according to the defocus amount to enable adjusting the focus of the imaging apparatus 100.

Figure 6A:
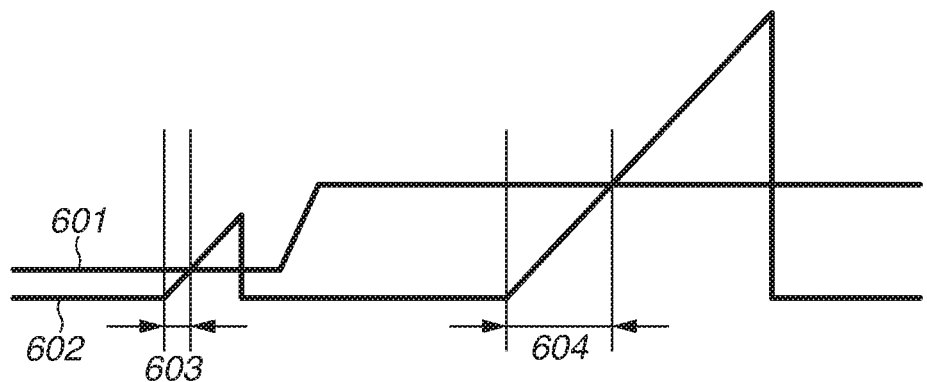
FIGS. 6A, 6B, and 6C are timing diagrams that illustrate analog-to-digital (AD) conversion and saturated pixel detection according to the first exemplary embodiment.
Figure 6B:
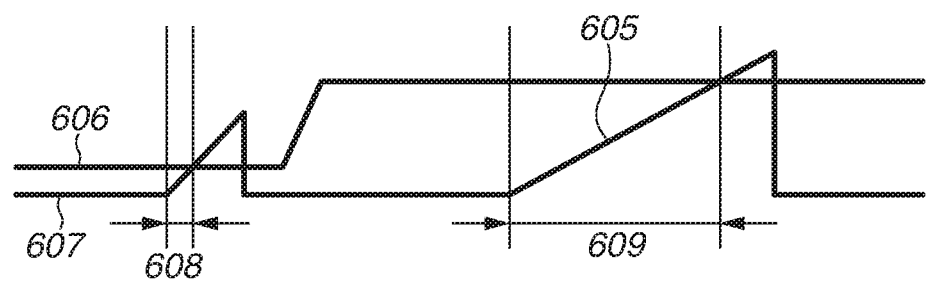
Figure 6C:
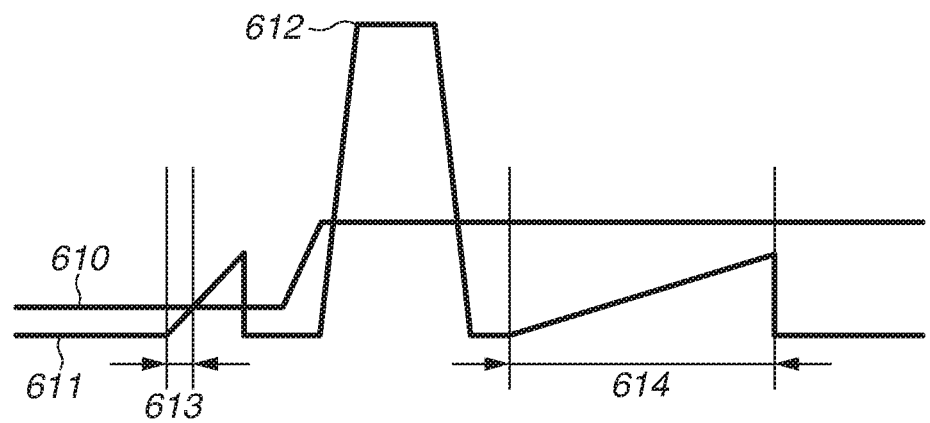

FIGS. 6A to 6C illustrate analog-to-digital conversion (AD conversion) for converting analog signals read from imaging and functional pixels by the read circuit 204 into digital signals. FIG. 6A schematically illustrates a voltage waveform describing the digital value of a pixel signal through AD conversion with the single slope method. An analog signal 601 is a signal read from an imaging pixel or functional pixel. A reference signal 602 is a signal to be compared with the analog signal 601 at the time of AD conversion. With the reference signal 602, a voltage is increased within a settable voltage range from the minimum to the maximum values with an arbitrary voltage resolution in synchronization with a clock. Then, the voltage of the reference signal 602 linearly changes. In the AD conversion period, the level of the reference signal 602 changes with time. The read circuit 204 compares the analog signal 601 having a stable voltage with the reference signal 602, via a comparison circuit. Then, the read circuit 204 counts, by using a counter, the number of clocks until the magnitude relation between the reference signal 602 and the analog signal 601 is reversed to convert the voltage value of the analog signal 601 into a digital value.

Since the clock period is constant, the number of clocks to be counted from the start to the end of AD conversion corresponds to periods 603 and 604 during which AD conversion starts and ends. The number of clocks generated in the periods 603 and 604 corresponds to the lengths of the periods 603 and 604, respectively.

The analog signal 601 of a pixel includes an offset variation in which the reference output value, what is called the zero-level voltage, varies. In the pixel 201 illustrated in FIG. 3, the signal output by the pixel 201 when the reset transistor 306 cancels the reset state of the FD capacitor 303 is referred to as an N signal. The N signal is the voltage for the offset variation. During the period 603, the read circuit 204 compares the analog signal (N signal) 601 with the reference signal 602 and performs AD conversion on the N signal. Then, the output signal of the pixel 201 after the transfer transistor 302 transfers electric charges of the photodiode 301 to the FD capacitor 303 is referred to as an S signal. The S signal is a pixel signal containing the offset variation. During the period 604, the read circuit 204 compares the analog signal (S signal) 601 with the reference signal 602 and performs AD conversion on the S signal. The signal processing circuit 206 illustrated in FIG. 2 subtracts the digital N signal from the digital S signal to remove the offset variation and outputs the pixel signals.

FIG. 6B illustrates AD conversion when the inclination of the reference signal 602 is decreased. An analog signal 606 corresponds to the analog signal 601 illustrated in FIG. 6A. A reference signal 607 corresponds to the reference signal 607 illustrated in FIG. 6A. A period 608 is the AD conversion period for the N signal. A period 609 is the AD conversion period for the S signal. A reference signal 605 is the reference signal 607 during the period 609. The inclination of the reference signal 605 is smaller than the inclination of the reference signal 602 during the period 604. If the clock period remains unchanged in FIGS. 6A and 6B, the resolution can be increased by decreasing the voltage step of the reference signal 605 which increases with the clock. Although the analog signal 606 is the same as the analog signal 601, the inclination of the reference signal 605 used for AD conversion of the S signal is smaller than the inclination illustrated in FIG. 6A. As a result, the period 609 is longer than the period from 604, and accordingly the digital value of the S signal illustrated in FIG. 6B is larger than the digital value of the S signal illustrated in FIG. 6A. By changing the inclination of the reference signal 605 in this way, the S signal can be multiplied by a gain at the time of AD conversion.

On the other hand, the countable value of the counter for AD conversion is limited. Therefore, increasing the resolution of AD conversion decreases the range of the analog signal convertible into a digital value. An analog signal out of the range is output as a saturated digital value. More specifically, when multiplying the S signal by a gain based on the reference signal for AD conversion, it is not possible to determine whether the pixel signal is saturated.

Therefore, the read circuit 204 performs AD conversion, as illustrated in FIG. 6C. An analog signal 610 corresponds to the analog signal 601 illustrated in FIG. 6A. A reference signal 611 corresponds to the reference signal 602 illustrated in FIG. 6A. A period 613 is an AD conversion period of the N signal, and is similar to the periods 603 and 608. A period 614 is an AD conversion period of the S signal, and is similar to the periods 604 and 609. A reference signal 612 is a part of the reference signal 611 in a partial period between the periods 613 and 614, and is a threshold value. Before performing AD conversion on the S signal, the read circuit 204 changes the reference signal 611 to a voltage to enable determining of saturated pixel signals, like the reference signal 612, thus determining whether the pixel signal is saturated. The read circuit 204 compares the analog signal (S signal) 610 with the reference signal 612. In a case where the analog signal (S signal) 610 is smaller than the reference signal 612, when the reference signal 611 is smaller than the analog signal (S signal) 610 and the digital value is saturated during the period 614, the read circuit 204 can determine that the analog signal (S signal) 610 is not saturated. The image sensor unit 101 outputs a result of saturation detection to the signal processing unit 103. When the saturation is detected, the signal processing unit 103 performs processing for blooming countermeasures.

Figure 7:
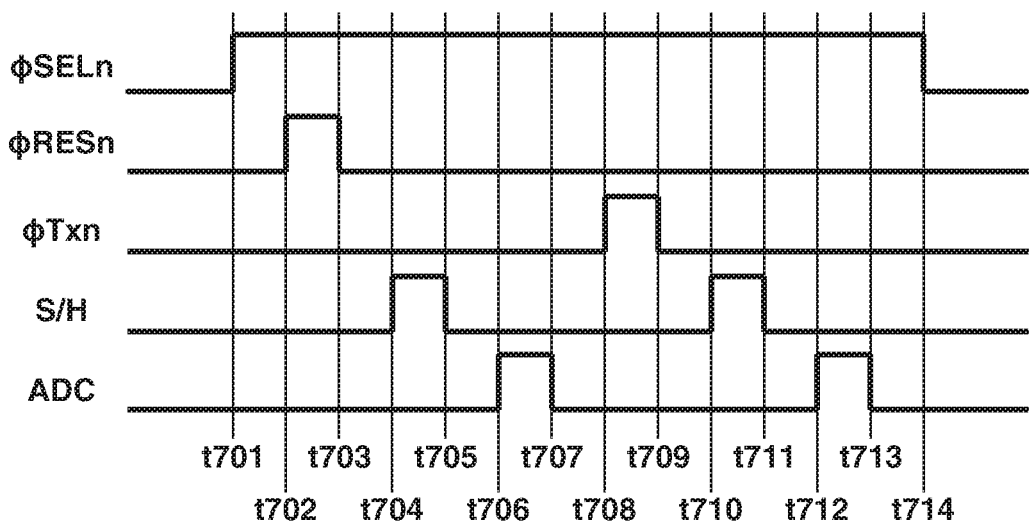
FIG. 7 is a timing chart illustrating pixel read timing according to the first exemplary embodiment.

FIG. 7 is a timing chart in which an analog signal is read from each pixel 201 in row n illustrated in FIG. 3. At time t701, the vertical scanning circuit 203 sets a control signal ΦSELn of the control line SELn to the high level. Then, in the pixels 201 in row n, the selection transistor 305 turns ON to select the pixels 201 in row n.

At time t702, the vertical scanning circuit 203 sets a control signal ΦRESn of the control line RESn to the high level. Then, in the pixels 201 in row n, the reset transistor 306 starts resetting the FD capacitor 303.

At time t703, the vertical scanning circuit 203 sets the control signal ΦRESn of the control line RESn to the low level. Then, in the pixels 201 in row n, the reset transistor 306 turns OFF to cancel the reset state of the FD capacitor 303. The pixels 201 in row n output the analog N signal based on the canceled reset state of the FD capacitor 303, to the signal output line 202.

At time t704, the read circuit 204 starts sampling and holding the N signal via an internal sample-hold circuit. At time t705, the read circuit 204 ends sampling and holding the N signal.

At time t706, the read circuit 204 starts converting the analog N signal into a digital N signal via an internal analog-to-digital conversion circuit. At time t707, the read circuit 204 ends the conversion of the analog N signal into a digital N signal.

At time t708, the vertical scanning circuit 203 sets a control signal ΦTxn of the control line Txn to the high level. Then, in the pixels 201 in row n, the transfer transistor 302 starts electric charge transfer from the photodiode 301 to the FD capacitor 303.

At time t709, the vertical scanning circuit 203 sets the control signal ΦTxn of the control line Txn to the low level. Then, in the pixels 201 in row n, the transfer transistor 302 ends electric charge transfer from the photodiode 301 to the FD capacitor 303. The pixels 201 in row n output the analog S signals based on electric charges of the FD capacitor 303, to the signal output line 202.

At time t710, the read circuit 204 starts sampling and holding the S signal via the internal sample-hold circuit. At time t711, the read circuit 204 ends sampling and holding the S signal.

At time t712, the read circuit 204 starts converting the analog S signal into a digital S signal via the internal analog-to-digital conversion circuit. At time t713, the read circuit 204 ends the conversion of the analog S signal into a digital S signal. For each pixel 201, the signal processing circuit 206 outputs the difference between the S and N signals as a pixel signal, to the output port 207. The output port 207 may be disposed for each pixel group.

At time t714, the vertical scanning circuit 203 sets the control signal ΦSELn of the control line SELn to the low level. Then, in the pixels 201 in row n, the selection transistor 305 turns OFF to cancel the selection of the pixels 201 in row n.

Figure 8:
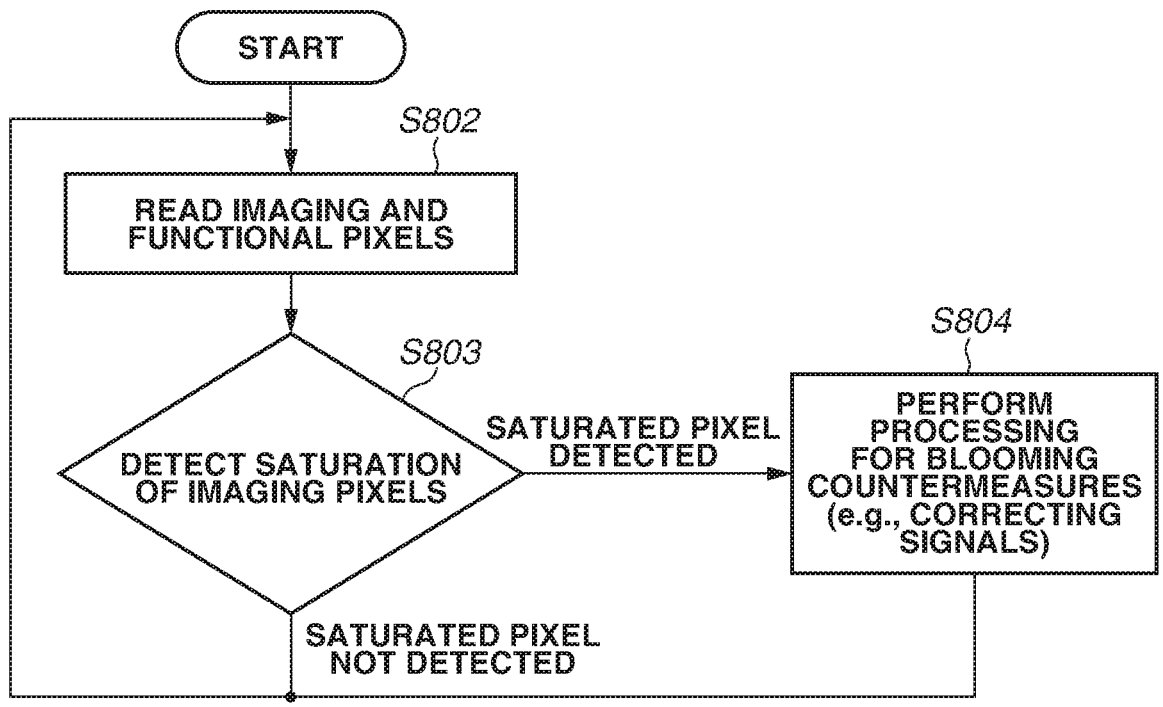
FIG. 8 is a flowchart illustrating operations according to the first exemplary embodiment.

FIG. 8 is a flowchart illustrating a method for controlling the imaging apparatus 100. The following describes reading of the imaging and functional pixels, saturation detection processing, and processing for booming countermeasures. In step S802, the image sensor unit 101 reads pixel signals of the imaging and functional pixels based on the processing method illustrated in FIG. 7. In step S803, the image sensor unit 101 detects saturated pixel signals of the imaging pixels based on the processing method illustrated in FIG. 6C and outputs a result of saturation detection to the signal processing unit 103. When the image sensor unit 101 does not detect saturated pixel signals of the imaging pixels (SATURATED PIXEL NOT DETECTED in step S803), the processing returns to step S802. The signal processing unit 103 repeats the processing of the following steps. On the other hand, when the image sensor unit 101 detects saturated pixel signals of the imaging pixels (SATURATED PIXEL DETECTED in step S803), the processing proceeds to step S804. In step S804, the signal processing unit 103 performs processing for blooming countermeasures (described below with reference to in FIGS. 9A to 9D). The blooming countermeasures may include correcting signals of the pixels to reduce the influence of blooming due to pixel saturation.

Figure 9A:
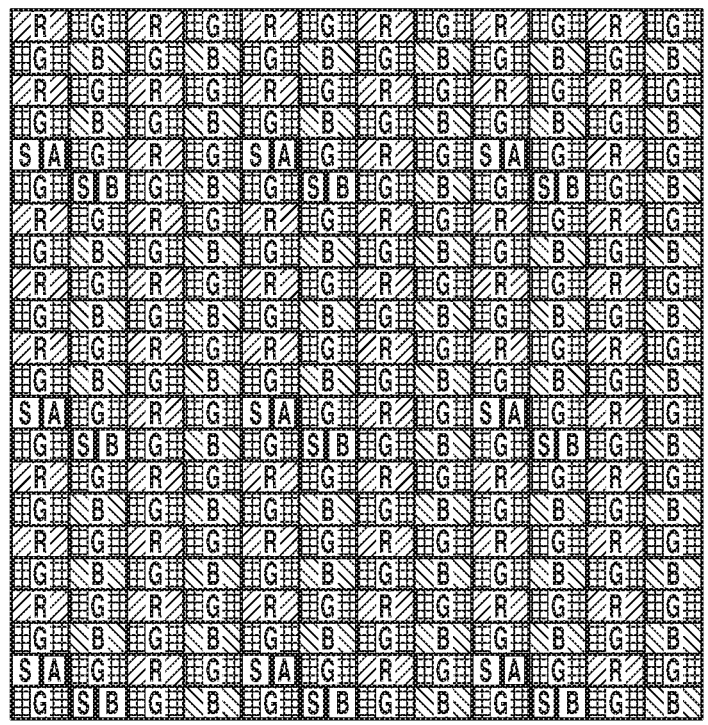
FIGS. 9A, 9B, 9C, and 9D illustrate processing for booming countermeasures according to the first exemplary embodiment.
Figure 9B:
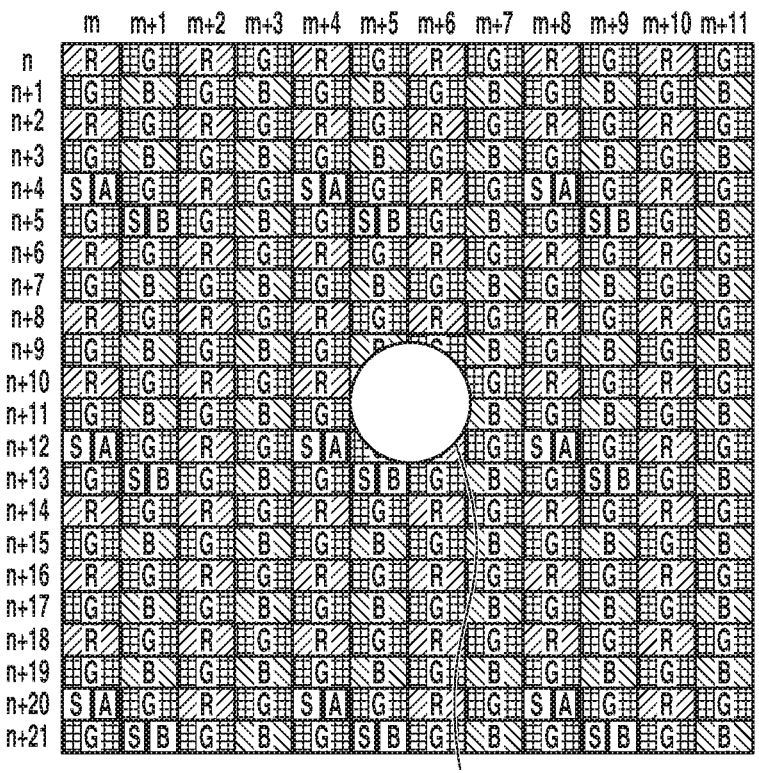
Figure 9C:
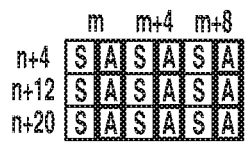
Figure 9D:
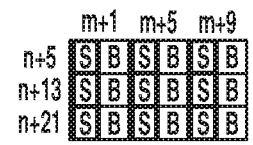

FIGS. 9A to 9D illustrate the processing for booming countermeasures in step S804 illustrated in FIG. 8. FIG. 9A schematically illustrates the image sensor unit 101 in which the pixels illustrated in FIGS. 4A and 5A are arranged. FIG. 9B illustrates the imaging plane of the image sensor unit 101 illustrated in FIG. 9A on which a subject image is formed. A saturated pixel 901 is a pixel where the pixel signal is saturated. FIGS. 9C and 9D illustrate a set of functional pixels SA and a set of functional pixels SB, respectively.

For example, when the saturated pixel 901 illustrated in FIG. 9B is detected, the signal processing unit 103 interpolates the pixel signals of a functional pixel SA (m+4, n+12) and a functional pixel SB (m+5, n+13) around the saturated pixels 901 based on the pixel signals of the functional pixels around the saturated pixels 901. In the case illustrated in FIG. 9C, the signal processing unit 103 corrects the average value of pixel signals of a functional pixel SA (m, n+12) and a functional pixel SA (m+8, n+12) to the left and right of (the periphery of) a functional pixel SA (m+4, n+12), respectively, as the pixel signal of the functional pixel SA (m+4, n+12). The signal processing unit 103 may correct the average value by using other adjacent functional pixels SA. In the case illustrated in FIG. 9D, the signal processing unit 103 corrects the average value of pixel signals of a functional pixel SB (m+1, n+13) and a functional pixel SA (m+9, n+12) to the left and right of (the periphery of) a functional pixel SB (m+5, n+13), respectively, as the pixel signal of the functional pixel SB (m+5, n+13).

Thus, the signal processing unit 103 reduces the influence of blooming from the saturated pixels 901 to the functional pixel SA (m+4, n+12) and the functional pixel SB (m+5, n+13).

The signal processing unit 103 may not only correct the pixel signals of the functional pixels SA and SB but also control exposure so that imaging pixels are not saturated. More specifically, when the saturation of imaging pixels is detected, the signal processing unit 103 shortens the charge accumulation time of imaging pixels, for example, to reduce exposure of imaging pixels. According to the present exemplary embodiment, focus detection pixels have been described above as examples of functional pixels. However, pixels built in memory, shading pixels, and other functional pixels may be applicable as functional pixels. Although focus detection pixels have been described above as examples of functional pixels, the present exemplary embodiment is not limited thereto. When the pixel configuration has different sensitivity, opening, exposure time, etc. from normal imaging pixels, the present disclosure enables reducing of the blooming influence. In particular, the disclosure is effective when pixel signals are read by differentiating between exposure of imaging pixels and exposure of functional pixels. In addition, the detection results for functional pixels may be combined as blooming countermeasures, and functional pixels may be used for detection of the saturation of imaging pixels.

The first exemplary embodiment has been described centering on a method for detecting saturated pixel signals of imaging pixels and processing for reducing the influence of the blooming on functional pixels when the saturation is detected. According to the present exemplary embodiment, the limitation on the charge accumulation time of imaging pixels can be alleviated. In particular, the present exemplary embodiment is suitable in a case where functional pixels are discretely arranged in imaging pixels.

Figure 10:
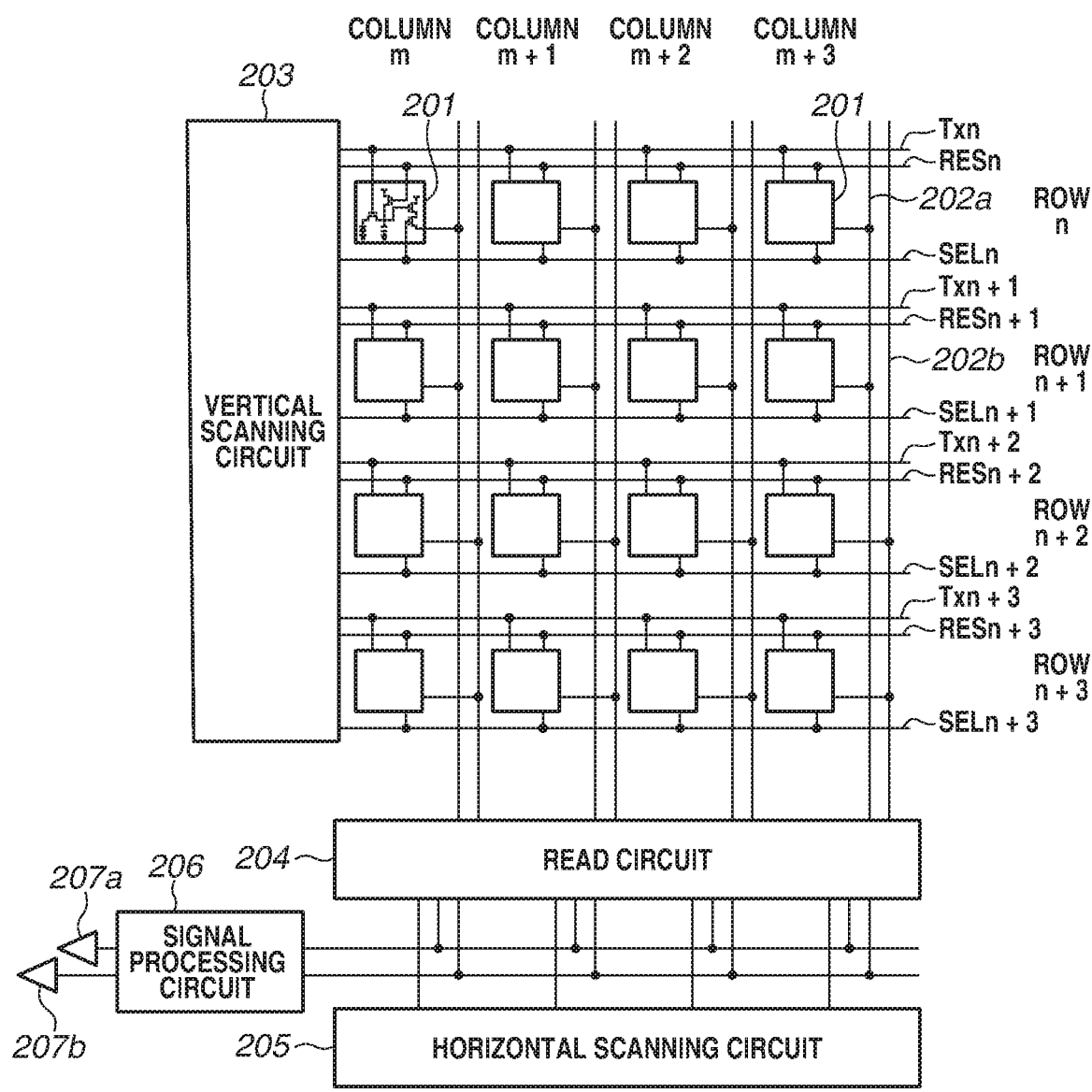
FIG. 10 illustrates an example of a configuration of an image sensor according to a second exemplary embodiment.

FIG. 10 illustrates an example of a configuration of the image sensor unit 101 according to a second exemplary embodiment. The following describes differences of the configuration illustrated in FIG. 10 from the configuration illustrated in FIG. 2. The plurality of the pixels 201 is divided into two pixel groups-a and -b, and may be divided into three or more pixel groups. The first exemplary embodiment has been described centering on a pixel group of imaging pixels and a pixel group of functional pixels having different structures between them. According to the second exemplary embodiment, the pixels 201 of the pixel group-a and the pixels 201 of the pixel group-b have the same structure. Referring to FIG. 10, the pixel group-a includes the pixels 201 in row n and the pixels 201 in row n+1. The pixel group-b includes the pixels 201 in row n+2 and the pixels 201 in row n+3.

Different pixel groups-a and -b may exist in the same row of the pixels 201. In this case, the control lines Txn, RESn, and SELn are different for each pixel group. The pixel group-a is controlled by control lines Txna, RESna, and SELna (not illustrated), and the pixel group-b is controlled by control lines Txnb, RESnb, and SELnb (not illustrated).

Signal output lines 202a and 202b correspond to the signal output line 202 illustrated in FIG. 2 and output the signals of the pixels 201 to the read circuit 204. The signal output line 202a connects the pixels 201 of the pixel group-a to the read circuit 204, and the signal output line 202b connects the pixels 201 of the pixel group-b to the read circuit 204.

Output ports 207a and 207b correspond to the output port 207 illustrated in FIG. 2 and output the signals of the signal processing circuit 206 to the outside. The output port 207a outputs signals of the pixels 201 of the pixel group-a, and the output port 207b outputs signals of the pixels 201 of the pixel group-b.

Figure 11:
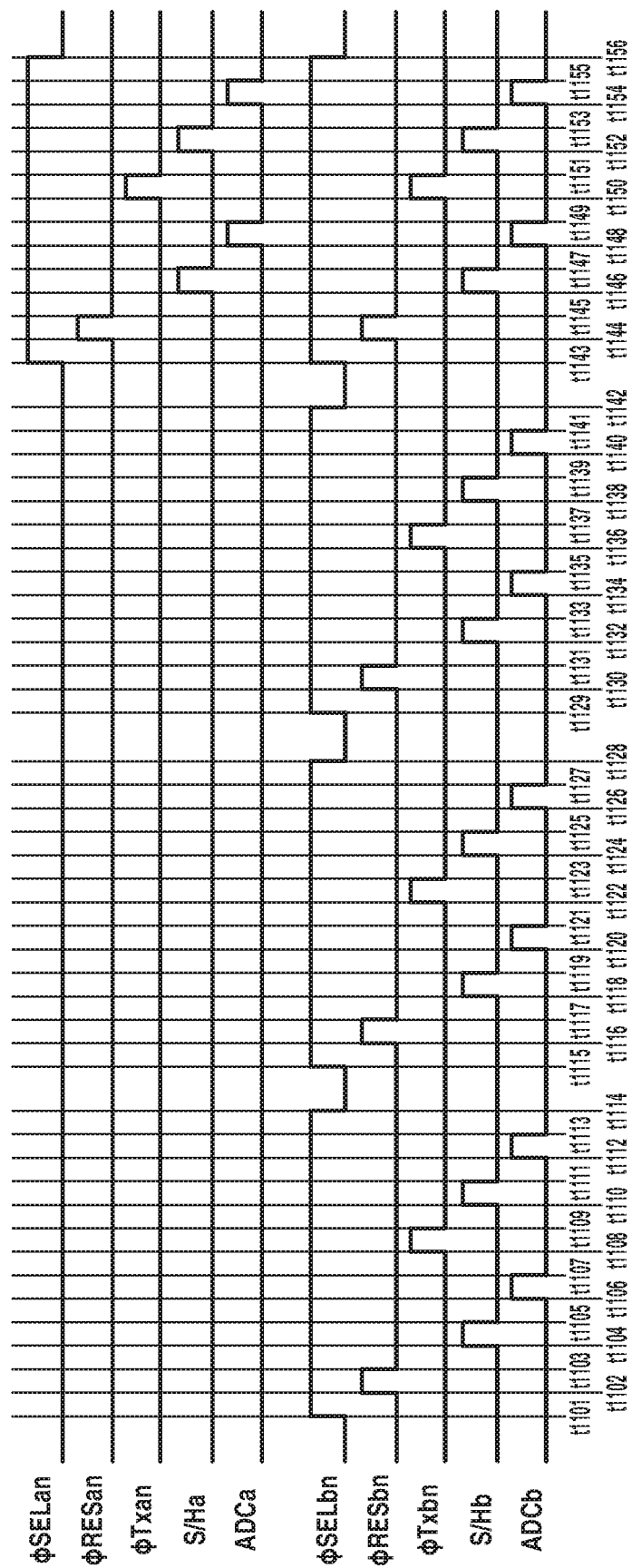
FIG. 11 is a timing chart illustrating pixel read timing according to the second exemplary embodiment.

FIG. 11 is a timing chart illustrating a method for controlling the image sensor unit 101, where analog signals are read from the pixels 201 in row n. The plurality of pixels 201 is divided into the pixel groups-a and -b, which are independently read.

Control signals ΦSELan, ΦRESan, ΦTxan, S/Ha, and ADCa are control signals for the pixel group-a. Control signals ΦSELan, ΦRESan, and ΦTxan are control signals for the pixels 201 belonging to the pixel group-a of the pixels 201 in row n.

Control signals ΦSELbn, ΦRESbn, ΦTxbn, S/Hb, and ADCb are control signals for the pixel group-b. Control signals ΦSELbn, ΦRESbn, and ΦTxbn are control signals for the pixels 201 belonging to the pixel group-b of the pixels 201 in row n. The following illustrates an example where the pixel group-b reads pixel signals at a frame rate four times faster than the pixel group-a.

At time t1101, the vertical scanning circuit 203 sets the control signal ΦSELbn of the control line SELbn to the high level. Then, in the pixels 201 of the pixel group-b in row n, the selection transistor 305 turns ON to select the pixels 201 of the pixel group-b in row n.

At time t1102, the vertical scanning circuit 203 sets the control signal ΦRESbn of the control line RESbn to the high level. Then, in the pixels 201 of the pixel group-b in row n, the reset transistor 306 starts resetting the FD capacitor 303.

At time t1103, the vertical scanning circuit 203 sets the control signal ΦRESbn of the control line RESbn to the low level. Then, in the pixels 201 of the pixel group-b in row n, the reset transistor 306 turns OFF to cancel the reset state of the FD capacitor 303. The pixels 201 of the pixel group-b in row n outputs the analog N signal based on the canceled reset state of the FD capacitor 303, to the signal output line 202b.

At time t1104, the read circuit 204 starts sampling and holding the N signals of the pixel group-b via the internal sample-hold circuit. At time t1105, the read circuit 204 ends sampling and holding the N signals of the pixel group-b.

At time t1106, the read circuit 204 starts converting the analog N signal into a digital N signal for the pixel group-b via the internal analog-to-digital conversion circuit. At time t1107, the read circuit 204 ends the conversion of the analog N signal into a digital N signal for the pixel group-b.

At time t1108, the vertical scanning circuit 203 sets the control signal ΦTxbn of the control line Txbn to the high level. Then, in the pixels 201 of the pixel group-b in row n, the transfer transistor 302 starts electric charge transfer from the photodiode 301 to the FD capacitor 303.

At time t1109, the vertical scanning circuit 203 sets the control signal ΦTxbn of the control line Txbn to the low level. Then, in the pixels 201 of the pixel group-b in row n, the transfer transistor 302 ends electric charge transfer from the photodiode 301 to the FD capacitor 303. The pixels 201 of the pixel group-b in row n output the analog S signals based on electric charges of the FD capacitor 303, to the signal output line 202b.

At time t1110, the read circuit 204 starts sampling and holding the S signals of the pixel group-b via the internal sample-hold circuit. At time t1111, the read circuit 204 ends sampling and holding the S signals of the pixel group-b.

At time t1112, the read circuit 204 starts converting the analog S signal into a digital S signal for the pixel group-b via the internal analog-to-digital conversion circuit. At time t1113, the read circuit 204 ends the conversion of the analog S signal into a digital S signal for the pixel group-b. For each pixel 201 of the pixel group-b, the signal processing circuit 206 outputs the difference between the S and N signals as a pixel signal, to the output port 207b.

At time t1114, the vertical scanning circuit 203 sets the control signal ΦSELbn of the control line SELbn to the low level. Then, in the pixels 201 of the pixel group-b in row n, the selection transistor 305 turns OFF to cancel the selection of the pixels 201 of the pixel group-b in row n.

At the above-described time t1101 to t1114, the image sensor unit 101 reads pixel signals of the pixel group-b. Then, at time t1115 to t1128, at time t1129 to t1142, and at time t1143 to t1156, the image sensor unit 101 repeats reading the pixel signals of the pixels 201 of the pixel group-b in row n, similar to the processing at time t1101 to t1114. At time t1143 to t1156, the image sensor unit 101 reads pixel signals of the pixels 201 of the pixel group-a in row n. Since the image sensor unit 101 reads pixel signals of the pixel group-a at intervals ¼ times the intervals of the pixel group-b, the image sensor unit 101 reads the pixel group-a once each time the image sensor unit 101 reads the pixel group-b four times. At time t1143 to t1156, the image sensor unit 101 reads the pixel group-a in a similar way to the read operations on the pixel group-b. The image sensor unit 101 reads the pixel group-a at a frame rate ¼ times the frame rate for the pixel group-b. The frame rate for the pixel group-b is higher than the frame rate for the pixel group-a. The pixel groups-a and -b are different in read time. Subsequently, the image sensor unit 101 repeats the processing from time t1101 to t1156.

At time t1143, the vertical scanning circuit 203 sets the control signal ΦSELan of the control line SELan to the high level. Then, in the pixels 201 of the pixel group-a in row n, the selection transistor 305 turns ON to select the pixels 201 of the pixel group-a in row n.

At time t1144, the vertical scanning circuit 203 sets the control signal ΦRESan of the control line RESan to the high level. Then, in the pixels 201 of the pixel group-a in row n, the reset transistor 306 starts resetting the FD capacitor 303.

At time t1145, the vertical scanning circuit 203 sets the control signal ΦRESan of the control line RESan to the low level. Then, in the pixels 201 of the pixel group-a in row n, the reset transistor 306 turns OFF to cancel the reset state of the FD capacitor 303. The pixels 201 of the pixel group-a in row n output the analog N signal based on the canceled reset state of the FD 303, to the signal output line 202a.

At time t1146, the read circuit 204 starts sampling and holding the N signals of the pixel group-a via the internal sample-hold circuit. At time t1147, the read circuit 204 ends sampling and holding the N signals of the pixel group-a.

At time t1148, the read circuit 204 starts converting the analog N signal to a digital N signal for the pixel group-a via the internal analog-to-digital conversion circuit. At time t1149, the read circuit 204 ends the conversion of the analog N signal to a digital N signal for the pixel group-a.

At time t1150, the vertical scanning circuit 203 sets the control signal ΦTxan of the control line Txan to the high level. Then, in the pixels 201 of the pixel group-a in row n, the transfer transistor 302 starts electric charge transfer from the photodiode 301 to the FD capacitor 303.

At time t1151, the vertical scanning circuit 203 sets the control signal ΦTxan of the control line Txan to the low level. Then, in the pixels 201 of the pixel group-a in row n, the transfer transistor 302 ends electric charge transfer from the photodiode 301 to the FD capacitor 303. The pixels 201 of the pixel group-a in row n output the analog S signals based on electric charges of the FD capacitor 303, to the signal output line 202a.

At time t1152, the read circuit 204 starts sampling and holding the S signals of the pixel group-a via the internal sample-hold circuit. At time t1153, the read circuit 204 ends sampling and holding the S signals of the pixel group-a.

At time t1154, the read circuit 204 starts converting the analog S signal into a digital S signal for the pixel group-a via the internal analog-to-digital conversion circuit. At time t1155, the read circuit 204 ends the conversion of the analog S signal into a digital S signal for the pixel group-a. For each pixel 201 of the pixel group-a, the signal processing circuit 206 outputs the difference between the S and N signals to the output port 207a.

At time t1156, the vertical scanning circuit 203 sets the control signal ΦSELan of the control line SELan to the low level. Then, in the pixels 201 of the pixel group-a in row n, the selection transistor 305 turns OFF to cancel the selection of the pixels 201 of the pixel group-a in row n.

Figure 12:
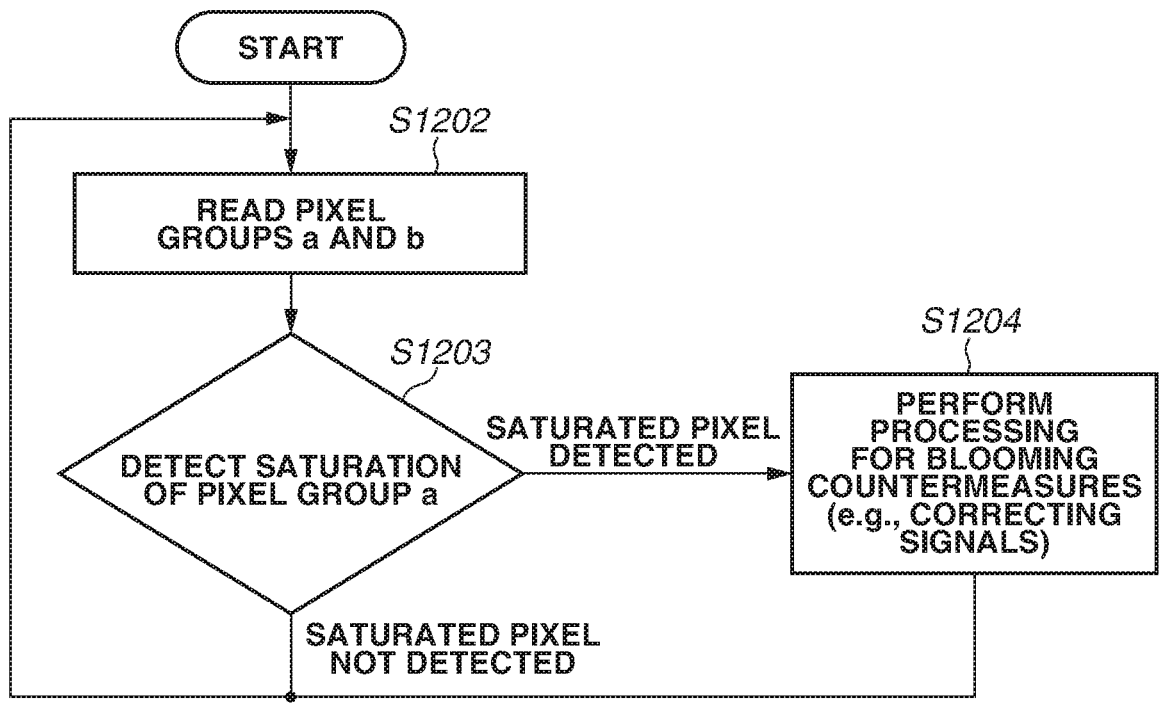
FIG. 12 is a flowchart illustrating operations according to the second exemplary embodiment.

FIG. 12 is a flowchart illustrating a method for controlling the imaging apparatus 100. The following describes read operations on the imaging groups-a and -b, the saturation detection processing, and the processing for booming countermeasures. In step S1202, the image sensor unit 101 reads pixel signals of the pixels 201 of the pixel groups-a and -b based on the processing method illustrated in FIG. 11. In step S1203, the signal processing unit 103 detects the presence or absence of saturated pixel signals of the pixels 201 of the pixel group-a by using a processing method (described below) illustrated in FIGS. 13A to 13C. When the signal processing unit 103 does not detect saturated pixel signals of the pixels 201 of the pixel group-a (SATURATED PIXEL NOT DETECTED in step S1203), the processing returns to step S1202. In step S1202, the signal processing unit 103 repeats the processing on the following rows. On the other hand, when the signal processing unit 103 detects saturated pixel signals of the pixels 201 of the pixel group-a (SATURATED PIXEL DETECTED in step S1203), the processing proceeds to step S1204. In step S1204, the signal processing unit 103 performs processing for blooming countermeasures (described below) illustrated in FIGS. 14A and 14B.

Figure 13A:
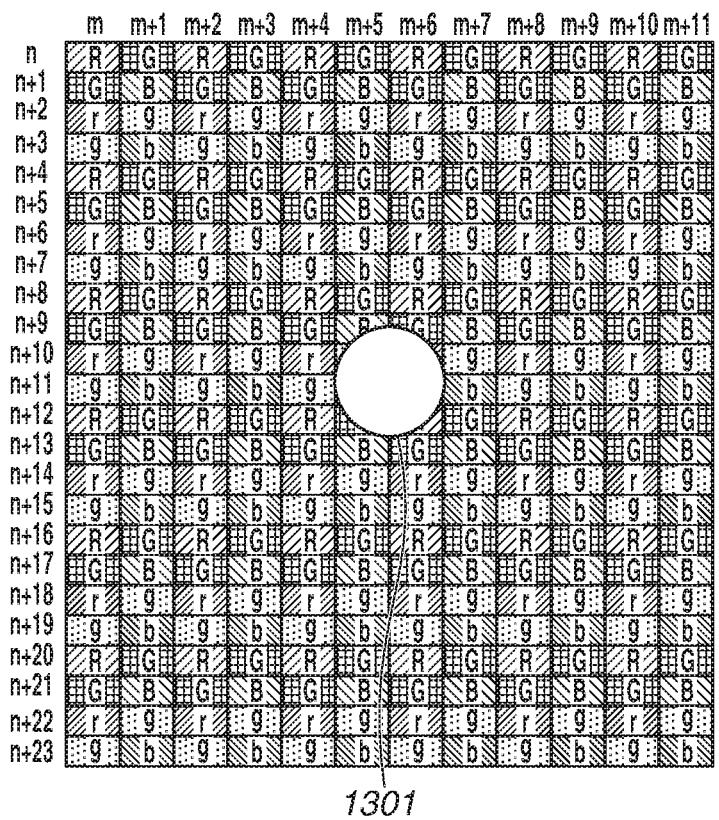
FIGS. 13A, 13B, and 13C illustrate saturated pixel detection according to the second exemplary embodiment.
Figure 13B:
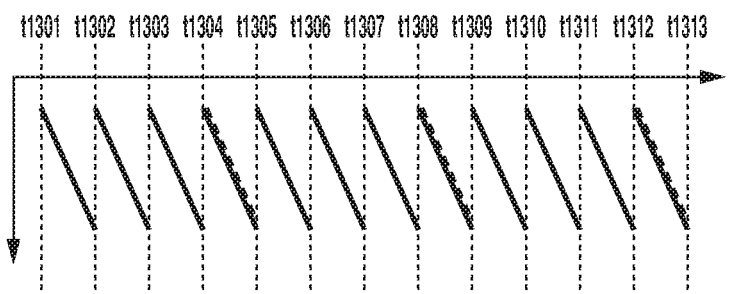
Figure 13C:
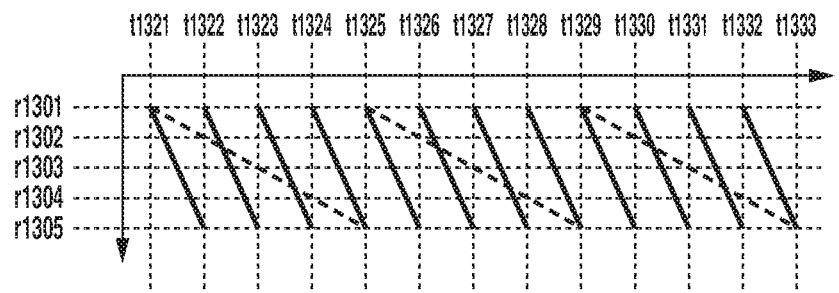

FIGS. 13A to 13C illustrate the saturation detection processing in step S1203 illustrated in FIG. 12. FIG. 13A schematically illustrates the image sensor unit 101 in which the pixels illustrated in FIG. 4A are arranged. The pixel group-a includes the R, G, and B pixels 201 in rows n, n+1, . . . n+4, n+5, and so on. The pixel group-b includes the r, g, and b pixels 201 in rows n+2, n+3, . . . n+6, n+7, and so on. The pixel groups-a and -b are arranged in alternation and have the same angle of view. The pixels 201 of the pixel groups-a and -b have the same structure.

The image sensor unit 101 reads pixel signals from the pixel groups-a and -b illustrated in FIG. 13A at the timing illustrated in FIG. 11. For example, when a high-luminance subject image is formed on pixels 1301 illustrated in FIG. 13A, the pixels in columns m+5 and m+6 and rows n+9, n+10, n+11, and n+12 become saturated pixels, possibly exerting the influence of blooming on the surrounding pixels.

As illustrated in FIG. 11, the pixel group-b provides a higher frame rate than the pixel group-a. Therefore, the pixel group-a provides a longer charge accumulation time setting than the pixel group-b. Therefore, the pixel group-a is more likely to be saturated pixels where blooming occurs than the pixel group-b.

On the other hand, while reading one frame of the pixel group-a, the image sensor unit 101 can read the pixel group-b a plurality of times (four times according to the present exemplary embodiment). Therefore, the signal processing unit 103 can predict the presence or absence of saturated pixels of the pixel group-a based on pixel signals of the pixel group-b read before reading the pixel group-a and exposure of the pixel groups-a and -b.

FIG. 13B illustrates a method for predicting saturated pixels of the pixel group-a, and a relation in time and read target row between the pixel groups-a and -b. A dashed line denotes read operations performed on the pixel group-a, and a solid line denotes read operations performed on the pixel group-b. For example, for the pixel group-b, the image sensor unit 101 sequentially performs read operations from the top row downward at time t1301 to t1302. After reading the bottom row at time t1302, the image sensor unit 101 sequentially performs read operations on the pixel group-b from the top row downward in a similar way at time t1301. Subsequently, the image sensor unit 101 repeats similar read operations for the pixel group-b.

For the pixel group-a, the image sensor unit 101 sequentially performs read operations from the top row downward at time t1304 to t1305. For the pixel group-a, the image sensor unit 101 perform read operations at a frame rate ¼ times the frame rate for the pixel group-b. Therefore, referring to FIG. 13B, the image sensor unit 101 reads the pixel group-a once each time the image sensor unit 101 reads the pixel group-b four times.

The above saturated pixel detection will be described below. For example, the signal processing unit 103 detects saturated pixel signals of the pixel group-a read at time t1304 to t1305 by using the pixel signals of the pixel group-b read at time t1301 to t1302.

Pixel signals of the pixel group-b read at time t1301 to t1302 are referred to as signal b. Pixel signals of the pixel group-a read at time t1304 to t1305 are referred to as a signal a. Exposure of the pixel group-b read at time t1301 to t1302 is referred to as exposure b. Exposure of the pixel group-a read at time t1304 to t1305 is referred to as exposure a. The signal processing unit 103 predicts whether the signal a is saturated based on the signal b, the exposure b, and the exposure a, as represented by inequality (1). A saturated signal value is a value previously defined to determine whether the signal a is a saturated signal.

$$\text{Saturated signal value} < \text{Signal } b * \text{Exposure } a/\text{Exposure } b \quad (1)$$

When inequality (1) is satisfied, the signal processing unit 103 predicts that the signal a will be saturated. On the other hand, when the inequality (1) is not satisfied, the signal processing unit 103 predicts that the signal a is not saturated. When the signal processing unit 103 predicts that the signal a will be saturated, the signal processing unit 103 performs processing for blooming countermeasures on pixel signals of the pixel group-b around the pixels of the signal a.

Next, a case where the read speed differs between the pixel groups-a and -b, as illustrated in FIG. 13C, will be described below. In this case, when predicting the presence or absence of saturated pixels in frame units as illustrated in FIG. 13B, the signal processing unit 103 needs to devise processing when the interval of the read time differs between the pixel groups-a and -b depending on rows. In such a case, the signal processing unit 103 changes the frame of the pixel group-b used for saturation prediction, for each row of the pixel group-a. For example, for the read rows r1301 to r1305, the signal processing unit 103 changes, for each row, the pixel group-b used for saturation prediction of the pixel group-a to be read at time t1325 to t1329.

More specifically, the signal processing unit 103 uses pixel signals of the pixel group-b in rows r1301 to r1302 read at time t1322 to t1323 for the saturation prediction of the pixel group-a in rows r1301 to r1302 to be read at time t1325 to t1326.

Likewise, the signal processing unit 103 uses pixel signals of the pixel group-b in rows r1302 to r1303 read at time t1322 to t1323 for the saturation prediction of the pixel group-a in rows r1302 to r1303 to be read at time t1326 to t1327.

Likewise, when the read speed differs between the pixel groups-a and -b, the signal processing unit 103 changes, for each row, the frame of the pixel group-b to be used for the saturation prediction according to the read speed.

Figure 14A:
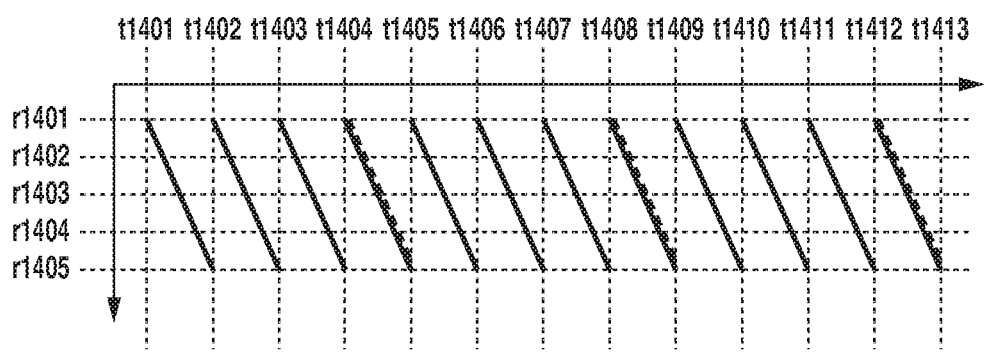
FIGS. 14A and 14B illustrate processing for booming countermeasures according to the second exemplary embodiment.
Figure 14B:
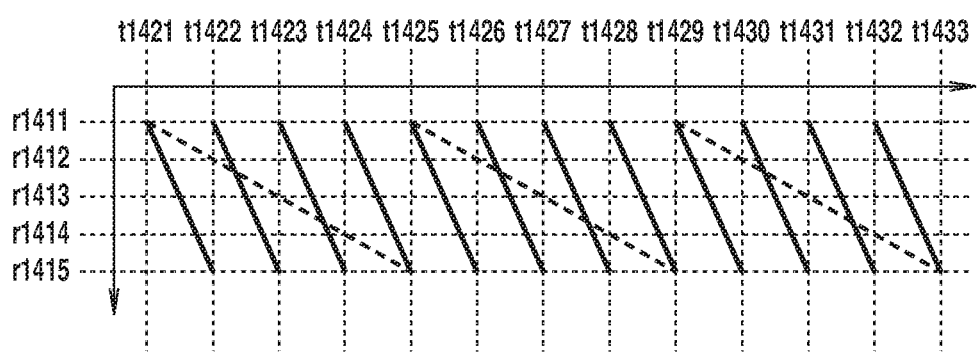

FIGS. 14A and 14B illustrate the processing for booming countermeasures in step S1204 illustrated in FIG. 12. FIG. 14A is similar to FIG. 13B, where a dashed line denotes read operations performed on the pixel group-a, and a solid line denotes read operations performed on the pixel group-b.

When the signal processing unit 103 predicts saturated pixels based on the method described above with reference to FIG. 13B, the pixel group-b may possibly be affected by blooming from the pixel group-a in the period since the pixel group-a is saturated until the pixel group-a is read.

The following describes an example of a case where the signal processing unit 103 predicts the saturation of the pixel group-a read at time t1404 to t1405, based on signals in rows r1402 to r1403 of the pixel group-b read at time t1401 to t1402. In this case, the rows r1402 to r1403 of the pixel group-b read at time t1402 to t1403, at time t1403 to t1404, and at time t1404 to t1405 are affected by blooming. In this case, the signal processing unit 103 interpolates pixel signals of the pixels to be affected by blooming of the pixel group-b read at time t1402 to t1403, from t1403 to t1404, and from t1404 to t1405, based on pixel signals of the pixel group-b read at time t1401 to t1402. Thus, false signals due to blooming can be corrected.

In this case, the signal processing unit 103 may interpolate pixel signals by using signals of the pixel group-b to be read after the pixel group-a which outputs saturated signals, for example, at time t1405 to t1406, instead of signals read at time t1401 to t1402. The signal processing unit 103 may also interpolate pixel signals based on the average value of signals of the pixel group-b at the time before and after the time of the pixel group-a which outputs saturated pixels, for example, at time t1401 to t1402 and at time t1405 to t1406.

FIG. 14B illustrates a case where the read speed differs between the pixel groups-a and -b, similar to FIG. 13C. The following describes a case where, based on pixel signals in rows r1411 to r1412 of the pixel group-b read at time t1422 to t1423, the signal processing unit 103 predicts saturated pixels of the pixel group-a read from subsequent time t1425 to t1429. In this case, the signal processing unit 103 interpolates pixel signals of pixels around the saturated pixels read at time t1422 to t1423, at time t1423 to t1424, and at time t1424 to t1425, based on pixel signals of the pixel group-b read at time t1422 to t1423.

Similar to the descriptions of FIG. 14A, the signal processing unit 103 may start interpolation based on pixel signals of the pixel group-b to be read at time t1426 to t1427. The signal processing unit 103 may also interpolate pixel signals based on the average value of pixel signals of the pixel group-b to be read at time t1422 to t1423 and pixel signals of pixel group-b to be read at time t1426 to t1427.

The second exemplary embodiment has been described above centering on a method for detecting saturated pixels of the pixel group-a, and processing for reducing the influence of blooming on the pixel group-b at the time of saturation detection. According to the present exemplary embodiment, the image sensor unit 101 performs charge accumulation and read operations at different time between the pixel groups-a and -b, making it possible to detect in advance the blooming to the pixel group-b read before reading the pixel group-a. Each pixel group may be determined in two-dimensional area units, not in row units.

Figure 15:
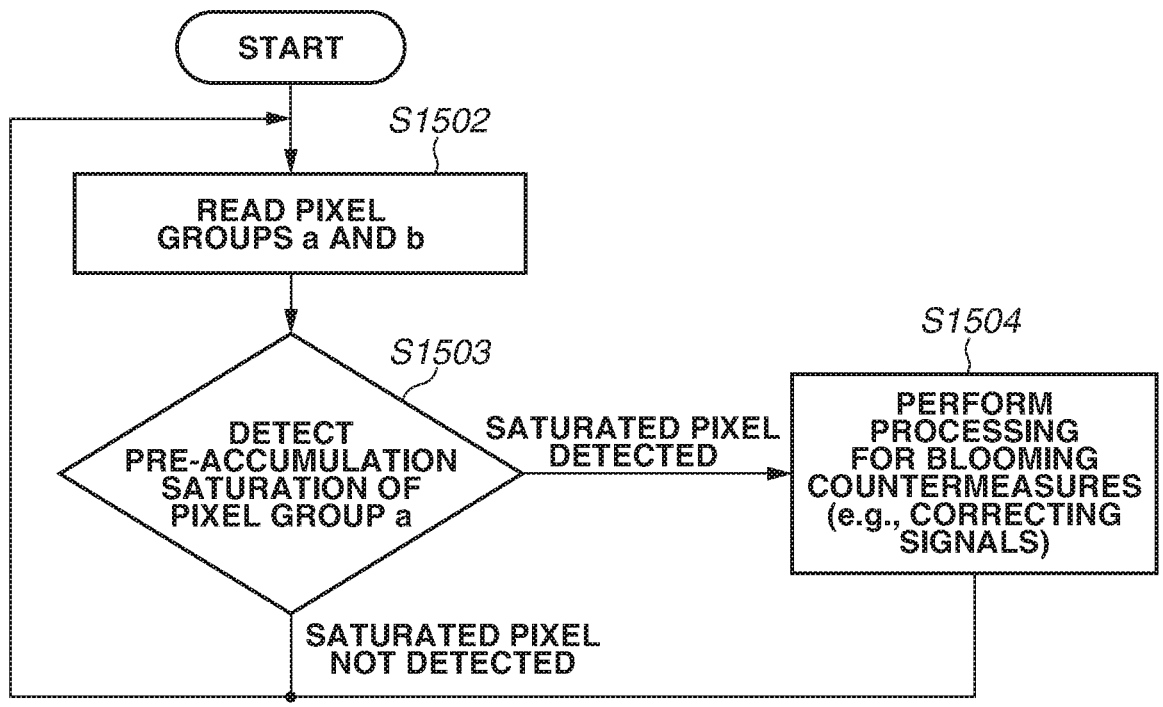
FIG. 15 is a flowchart illustrating operations according to a third exemplary embodiment.

FIG. 15 is a flowchart illustrating a method for controlling the imaging apparatus 100 according to a third exemplary embodiment. The flowchart indicates read operations on the pixel groups-a and -b, the saturation detection processing, and the processing for booming countermeasures. The second exemplary embodiment has been described above centering on the pixel groups-a and -b with different frame rates. The third exemplary embodiment has the configuration of the image sensor unit 101 illustrated in FIG. 10. The following describes countermeasures for blooming from saturated pixels of the pixel groups-a and -b having the same frame rate, before starting charge accumulation.

In step S1502, the image sensor unit 101 reads pixel signals of the pixels 201 of the pixel groups-a and -b. In step S1503, the signal processing unit 103 detects the presence or absence of the saturation of the pixels 201 of the pixel group-a before starting charge accumulation, based on a processing method (described below) illustrated in FIG. 16. When the signal processing unit 103 does not detect saturated pixels 201 of the pixel group-a before starting charge accumulation (SATURATED PIXEL NOT DETECTED in step S1503), the processing returns to step S1502. In step S1502, the signal processing unit 103 repeats the processing on the following rows. On the other hand, when the signal processing unit 103 detects saturated pixels 201 of the pixel group-a before starting charge accumulation (SATURATED PIXEL DETECTED in step S1503), the processing proceeds to step S1504. In step S1504, the signal processing unit 103 performs processing for blooming countermeasures (described below) illustrated in FIG. 16.

Figure 16:
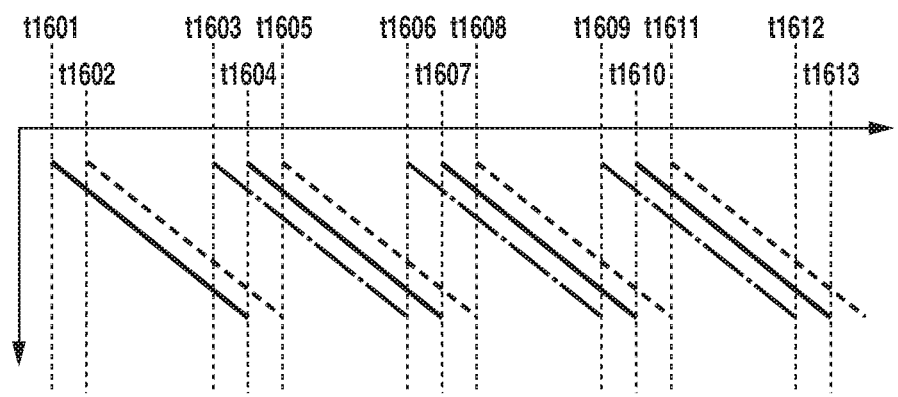
FIG. 16 illustrates saturated pixel detection according to the third exemplary embodiment.

FIG. 16 illustrates the saturation detection processing in step S1503 illustrated in FIG. 15. Prediction of saturated pixels of the pixel group-a will be described below with reference to FIG. 16. FIG. 16 illustrates a relation in time and read target row between the pixel groups-a and -b. A solid line denotes read operations on the pixel groups-a and -b, a one-point chain line denotes reset operations on the pixel group-a, and a dotted line denotes reset operations on the pixel group-b.

For example, when focusing on the top pixel row, the charge accumulation time of the pixel group-a to be read at time t1604 is the time period from time t1603 to t1604. Time t1603 is the time when the pixel group-a is reset. Likewise, the charge accumulation time of the pixel group-b to be read at time t1604 is the time period from time t1602 to t1604. Time t1602 is the time when the pixel group-b is reset.

The pixel group-b provides a longer charge accumulation time than the pixel group-a. Therefore, blooming from the pixel group-b to the pixel group-a may occur. To cope with this problem, the image sensor unit 101 can detect the saturation of the pixel group-b based on the method illustrated in FIG. 6C according to the first exemplary embodiment.

On the other hand, when the pixel group-a is saturated at time t1601 to t1603, blooming from the pixel group-a to the pixel group-b may occur. In this case, signals of the pixel group-a are reset at time t1603, and normal signals which are not saturated are read at time t1604. Therefore, only with the read signal values, it is not possible to determine whether the pixel group-a has been saturated by the time t1603 before starting charge accumulation.

Pixel signals of the pixel group-a read at time t1604 are referred to as a signal a. The charge accumulation time from time t1603 to t1604 of the signal a is referred to as accumulation time a. The read period of the pixel group-a is referred to as a period a. The signal processing unit 103 predicts the saturation of the pixel group-a before the charge accumulation start time t1603 based on the signal a, the accumulation time a, and the period a, as represented by the inequality (2). The saturated signal value is a value previously defined to determine whether the pixel group-a has been saturated before starting charge accumulation.

$$\text{Saturated signal value} < \text{Signal } a/\text{Accumulation time} \\ a*(\text{Period } a - \text{Accumulation time } a) \quad (2)$$

If the inequality (2) is satisfied, the signal processing unit 103 determines that the pixel group-a has been saturated before starting charge accumulation and performs processing for blooming countermeasures on pixel signals of the pixel group-b around the pixel group-a. If the inequality (2) is not satisfied, the signal processing unit 103 does not determine that the pixel group-a is saturated before starting charge accumulation.

The processing for blooming countermeasures in step S1504 illustrated in FIG. 15 will be described below. According to the first and the second exemplary embodiments, the signal processing unit 103 interpolates pixel signals of a pixel group affected by blooming, based on signal values of the same pixel group. More specifically, according to the first exemplary embodiment, the signal processing unit 103 interpolates pixel signals based on surrounding pixels read at the same time. According to the second exemplary embodiment, the signal processing unit 103 interpolates pixel signals based on a frame before and after the frame of the same pixel.

On the other hand, according to the third exemplary embodiment, the signal processing unit 103 interpolates pixel signals based on signal values of a different pixel group. Pixel signals read from the pixel group-a are referred to as a signal a. The charge accumulation time of the pixel group-a is referred to as accumulation time a, and the charge accumulation time of the pixel group-b is referred to as accumulation time b. When saturated pixels of the pixel group-a are detected based on the method described above with reference to FIG. 16, the signal processing unit 103 corrects pixel signals by calculating an interpolation signal value for pixels of the pixel group-b around saturated pixels of the pixel group-a, based on the accumulation time b, the accumulation time a, and the signal a, as represented by the equation (3).

$$\text{Interpolation signal value} = \text{Accumulation time } b/\text{Accumulation time } a*\text{Signal } a \quad (3)$$

The third exemplary embodiment has been described above centering on a method for detecting saturated pixels of the pixel group-a, and processing for reducing the influence of blooming on the pixel group-b at the time of saturation detection. According to the present exemplary embodiment, it is possible to detect blooming to the pixel group-b which arises in the period since the read operation till the reset operation on the pixel group-a, based on read pixel signals of the pixel group-a.

According to the second and the third exemplary embodiments, when the saturation of pixels of the pixel group-a is detected, the signal processing unit 103 may shorten the charge accumulation time of pixels of the pixel group-a, for example, to reduce exposure of pixels of the pixel group-a.

The imaging apparatus 100 according to a fourth exemplary embodiment has the same configuration as the imaging apparatus 100 according to the first exemplary embodiment, and uses a different method for detecting the saturation of imaging pixels (FIG. 6C) in step S803 illustrated in FIG. 8 from the method of the imaging apparatus 100 according to the first exemplary embodiment. Differences of the present exemplary embodiment from the first exemplary embodiment will be described below.

Figure 17:
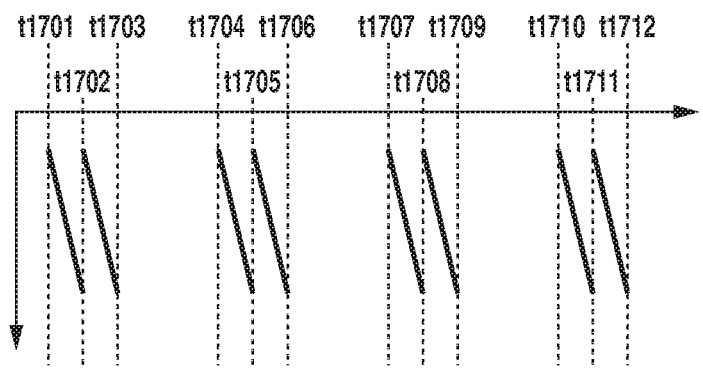
FIG. 17 illustrates saturated pixel detection according to a fourth exemplary embodiment.

FIG. 17 illustrates a relation in time and read target row between imaging and functional pixels according to the fourth exemplary embodiment. The pixel read period is not constant. The charge accumulation time differs between the frame to be read at time t1702 to t1703 (hereinafter referred to as a detection frame) and the frame to be read at time t7104 to t1705 (hereinafter referred to as an imaging frame). For example, the detection frame is a frame for reading functional pixels (focus detection pixels). The imaging frame is a frame for reading imaging pixels. The charge accumulation time of the detection frame is the time period from time t1701 to t1702. The charge accumulation time of the imaging frame is the time period from time t1702 to t1704, and is longer than the charge accumulation time of the detection frame.

The signal processing unit 103 predicts whether pixel signals of imaging pixels to be read in the imaging frame are saturated, based on the detection frame signal and the ratio of the imaging frame exposure to the detection frame exposure, as represented by the inequality (4).

Saturated signal value<Detection frame signal*Imaging frame exposure/Detection frame exposure (4)

The detection frame signal is a pixel signal to be read from a functional pixel (focus detection pixel) in the detection frame. The imaging frame exposure is exposure of imaging pixels in the imaging frame. The detection frame exposure is exposure of functional pixels (focus detection pixels) in the detection frame, and differs from the imaging frame exposure. The saturated signal value is a predefined value to determine whether pixel signals of imaging pixels are saturated. The exposure time of imaging pixels in the imaging frame is longer than the exposure time of functional pixels in the detection frame. In the detection frame, the signal processing unit 103 may control the detection frame exposure by using an electronic shutter to adjust the ratio of the detection frame exposure to the imaging frame exposure.

When the inequality (4) is satisfied (SATURATED PIXEL DETECTED in step S803 in FIG. 8), the signal processing unit 103 predicts that imaging pixels will be saturated, and the processing proceeds to step S804. In step S804, the signal processing unit 103 performs the processing for blooming countermeasures. On the other hand, when the inequality (4) is not satisfied (SATURATED PIXEL NOT DETECTED in step S803), the processing returns to step S802. Then, the signal processing unit 103 repeats the processing on the following rows.

As described above, unlike the first exemplary embodiment, the present exemplary embodiment makes it possible to detect the saturation of imaging pixels only by changing the frame rate, without using a special mechanism at the time of AD conversion. In addition, unlike the first exemplary embodiment, the present exemplary embodiment can detect the saturation of imaging pixels before the imaging frame, making it possible to determine whether to perform the processing for booming countermeasures in the imaging frame in advance.

The above-described exemplary embodiments are to be considered as illustrative in embodying the disclosure, and are not to be interpreted as restrictive of the technical scope of the disclosure. More specifically, the disclosure may be embodied in diverse forms without departing from the technical concepts or essential characteristics thereof. The imaging apparatus 100 is applicable not only to digital cameras and video cameras but also to smart phones, tablet computers, industrial cameras, and cameras for medical uses.

Other Embodiments

Embodiment(s) of the disclosure can also be realized by a computer of a system, a device, a processor, or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s). Some components of the imaging apparatus 100 may be implemented by such computer, processor, or apparatus. For example, the signal processing unit 103 may be implemented by a computer, a programmable processor, or an apparatus that executes instructions stored in a memory to perform operations described above. The computer or the apparatus may include one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-090504, filed May 9, 2018, which is hereby incorporated by reference herein in its entirety.

What is claimed is:

1. An imaging apparatus comprising:
   a first pixel group including first pixels for generating signals through photoelectric conversion;
   a second pixel group including second pixels for generating signals through photoelectric conversion;
   an analog-to-digital conversion unit configured to convert an analog signal of the first pixel into a digital form, wherein the analog-to-digital conversion unit includes a comparison unit for comparing signals of the first pixels with a reference signal while temporally changing a level in a first period, and comparing the signals of the first pixels with a threshold value in a second period;
   a detection unit configured to detect saturation of the first pixels in the first pixel group based on a result of comparison between the signals of the first pixels and the threshold value by the comparison unit; and
   a correction unit configured to, in a case where saturation of the first pixels is detected, correct signals of the second pixels in the second pixel group corresponding to the first pixels where the saturation has been detected by the detection unit.

2. The imaging apparatus according to claim 1, wherein the first and the second pixels differ in structure.

3. The imaging apparatus according to claim 1,
wherein the first pixels are pixels for generating an image, and
wherein the second pixels are pixels for detecting a focus.

4. The imaging apparatus according to claim 1, wherein the first and the second pixels differ in exposure.

5. The imaging apparatus according to claim 1, wherein the correction unit corrects the signals of the second pixels around the first pixels where the saturation has been detected.

6. The imaging apparatus according to claim 5, wherein the correction unit corrects the signals of the second pixels around the first pixels where the saturation has been detected, by using the signals of other second pixels.

7. The imaging apparatus according to claim 1, wherein the first and the second pixels are read out at different time.

8. The imaging apparatus according to claim 1, wherein the first and the second pixels have different frame rates.

9. The imaging apparatus according to claim 1,
wherein, in a third period, the second pixels in the second pixel group output signals,
wherein, in a fourth period after the third period, the first pixels in the first pixel group output signals, and
wherein the detection unit predicts saturation of the signals of the first pixels in the fourth period based on the signals of the second pixels in the third period, exposure of the first pixels in the fourth period, and exposure of the second pixels in the third period.

10. The imaging apparatus according to claim 1, further comprising a change unit configured to, in a case where saturation of the first pixels is detected, change exposure of the first pixels in the first pixel group.

11. An imaging apparatus comprising:
a first pixel group including first pixels for generating signals through photoelectric conversion;
a second pixel group including second pixels for generating signals through photoelectric conversion, wherein the first and the second pixels differ in exposure;
a detection unit configured to detect saturation of the first pixels in the first pixel group based on signals of the second pixels, exposure of the first pixels, and exposure of the second pixels; and
a correction unit configured to, in a case where saturation of the first pixels is detected, correct signals of the second pixels in the second pixel group corresponding to the first pixels where the saturation has been detected by the detection unit.

12. The imaging apparatus according to claim 11, wherein the first and the second pixels differ in structure.

13. The imaging apparatus according to claim 11,
wherein the first pixels are pixels for generating an image, and
wherein the second pixels are pixels for detecting a focus.

14. The imaging apparatus according to claim 11, wherein the correction unit corrects the signals of the second pixels around the first pixels where the saturation has been detected.

15. The imaging apparatus according to claim 14, wherein the correction unit corrects the signals of the second pixels around the first pixels where the saturation has been detected, by using the signals of other second pixels.

16. The imaging apparatus according to claim 11, wherein the first and the second pixels are read out at different time.

17. The imaging apparatus according to claim 11, wherein the first and the second pixels have different frame rates.

18. The imaging apparatus according to claim 11, further comprising a change unit configured to, in a case where saturation of the first pixels is detected, change the exposure of the first pixels in the first pixel group.

19. An imaging apparatus comprising:
a first pixel group including first pixels for generating signals through photoelectric conversion;
a second pixel group including second pixels for generating signals through photoelectric conversion;
a detection unit configured to detect saturation of the first pixels in the first pixel group; and
a correction unit configured to, in a case where saturation of the first pixels is detected, correct signals of the second pixels in the second pixel group corresponding to the first pixels where the saturation has been detected by the detection unit,
wherein, in a first frame, the second pixels in the second pixel group output signals,
wherein, in a second frame after the first frame, the first pixels in the first pixel group output signals, and
wherein the detection unit predicts saturation of the signals of the first pixels in the second frame based on the signals of the second pixels in the first frame, exposure of the first pixels in the second frame, and exposure of the second pixels in the first frame.

20. The imaging apparatus according to claim 19, wherein the first and the second pixels differ in structure.

21. The imaging apparatus according to claim 19,
wherein the first pixels are pixels for generating an image, and
wherein the second pixels are pixels for detecting a focus.

22. The imaging apparatus according to claim 19, wherein the first and the second pixels differ in exposure.

23. The imaging apparatus according to claim 19, wherein the correction unit corrects the signals of the second pixels around the first pixels where the saturation has been detected.

24. The imaging apparatus according to claim 23, wherein the correction unit corrects the signals of the second pixels around the first pixels where the saturation has been detected, by using the signals of other second pixels.

25. The imaging apparatus according to claim 19, wherein the first and the second pixels are read out at different time.

26. The imaging apparatus according to claim 19, wherein the first and the second pixels have different frame rates.

27. The imaging apparatus according to claim 19, further comprising a change unit configured to, in a case where saturation of the first pixels is detected, change the exposure of the first pixels in the first pixel group.

28. An imaging apparatus comprising:
a first pixel group including first pixels for generating signals through photoelectric conversion;
a second pixel group including second pixels for generating signals through photoelectric conversion;
a detection unit configured to detect saturation of first pixels in the first pixel group; and
a correction unit configured to, in a case where saturation of the first pixels is detected, correct signals of the second pixels in the second pixel group corresponding to the first pixels where the saturation has been detected by the detection unit,
wherein the detection unit predicts saturation of the first pixels before starting charge accumulation, based on the signals of the first pixels, a charge accumulation time of the first pixels, and a read period of the first pixels.

29. The imaging apparatus according to claim 28, wherein the correction unit corrects the signals of the second pixels based on the signals of the first pixels, the charge accumulation time of the first pixels, and a charge accumulation time of the second pixels.

30. The imaging apparatus according to claim 28, wherein the first and the second pixels differ in structure.

31. The imaging apparatus according to claim 28,
wherein the first pixels are pixels for generating an image, and
wherein the second pixels are pixels for detecting a focus.

32. The imaging apparatus according to claim 28, wherein the first and the second pixels differ in exposure.

33. The imaging apparatus according to claim 28, wherein the correction unit corrects the signals of the second pixels around the first pixels where the saturation has been detected.

34. The imaging apparatus according to claim 33, wherein the correction unit corrects the signals of the second pixels around the first pixels where the saturation has been detected, by using the signals of other second pixels.

35. The imaging apparatus according to claim 28, wherein the first and the second pixels are read out at different time.

36. The imaging apparatus according to claim 28, wherein the first and the second pixels have different frame rates.

37. The imaging apparatus according to claim 28, further comprising a change unit configured to, in a case where saturation of the first pixels is detected, change exposure of the first pixels in the first pixel group.

* * * * *